July 3, 1951  G. E. KENTIS, JR  2,558,761
CONTROL SYSTEM
Filed March 2, 1945  7 Sheets-Sheet 1
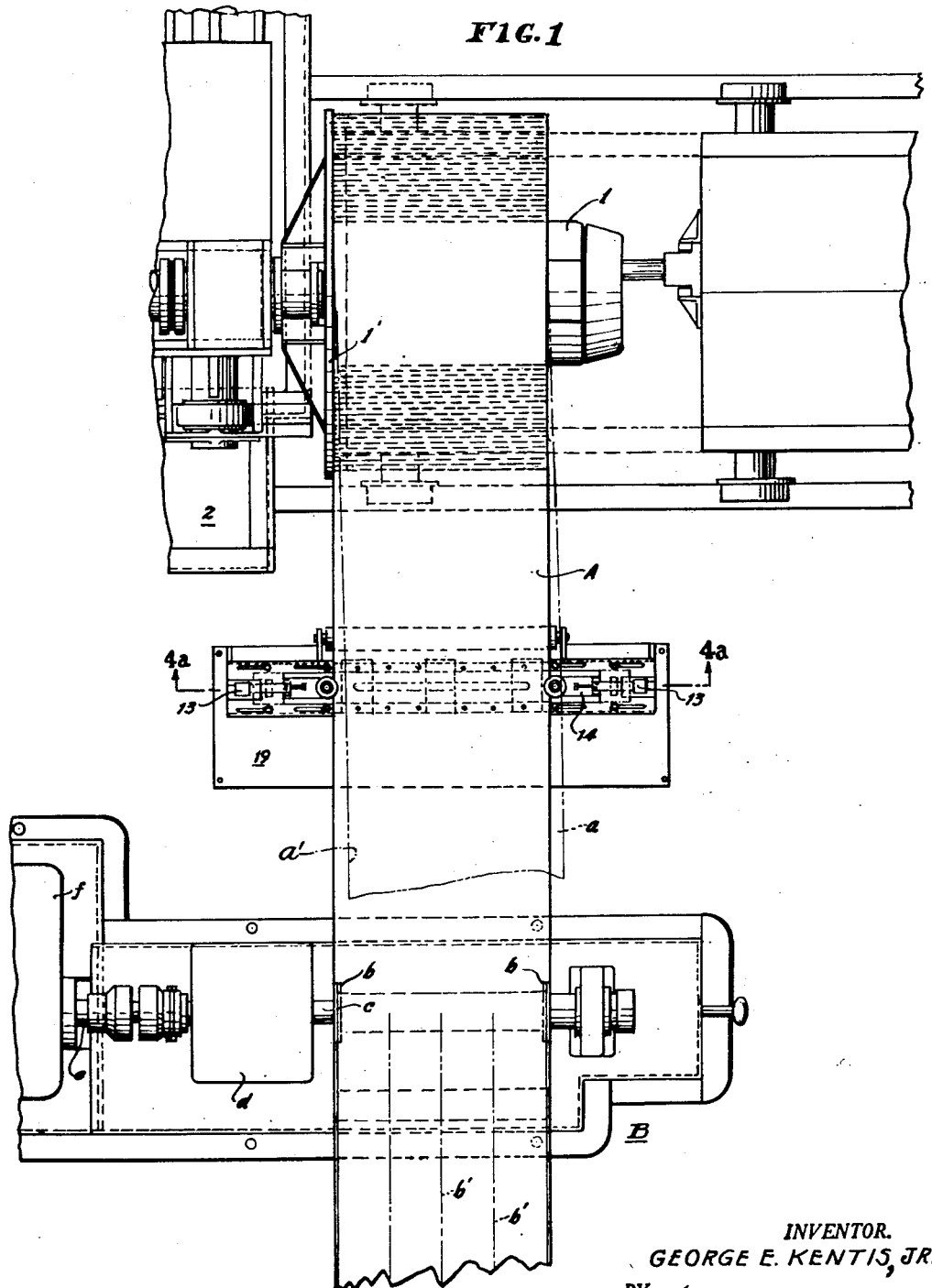
INVENTOR.
GEORGE E. KENTIS, JR.
BY Geo. B Pitts
attorney July 3, 1951  G. E. KENTIS, JR  2,558,761
CONTROL SYSTEM
Filed March 2, 1945  7 Sheets-Sheet 2
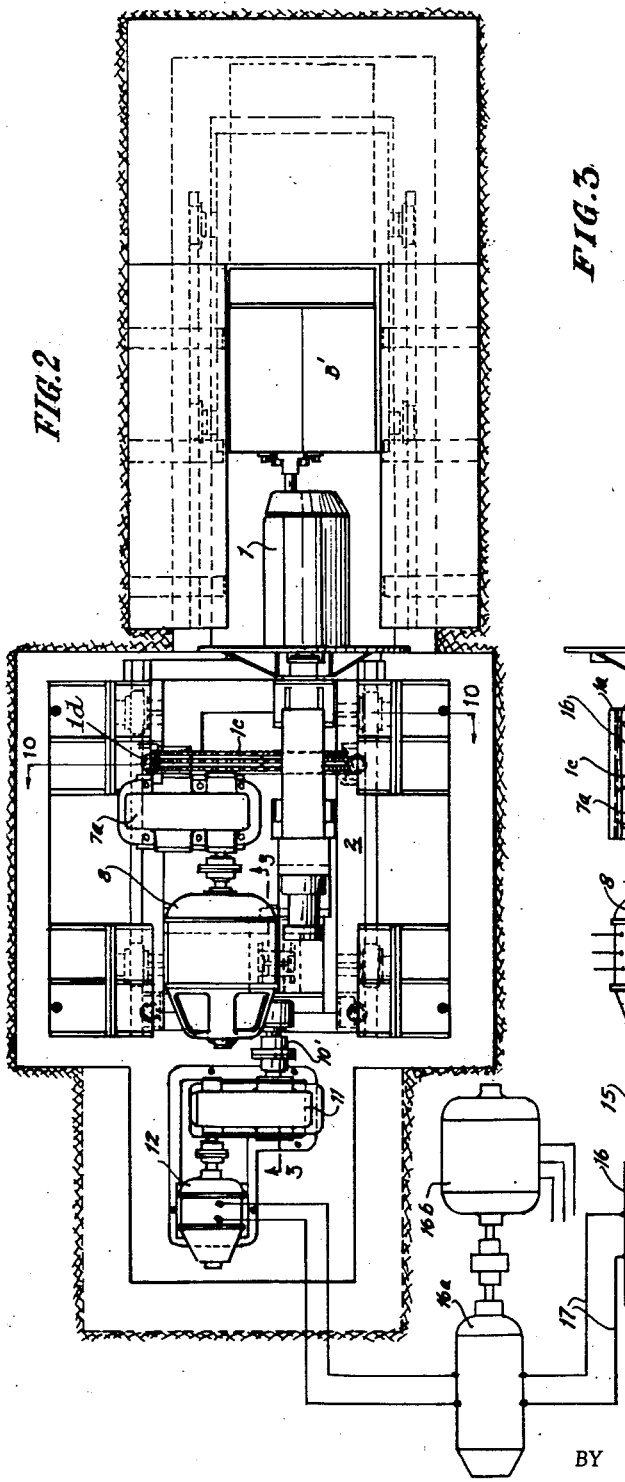
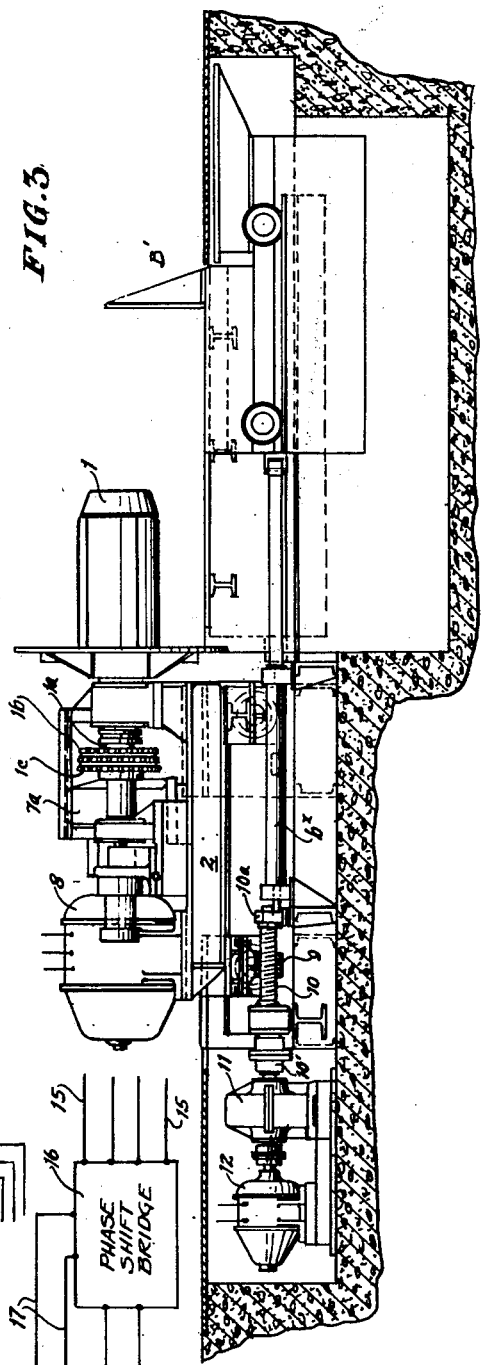
INVENTOR.
GEORGE E. KENTIS, JR.
BY Geo. B. Pitts
attorney July 3, 1951 G. E. KENTIS, JR 2,558,761
CONTROL SYSTEM
Filed March 2, 1945 7 Sheets-Sheet 3
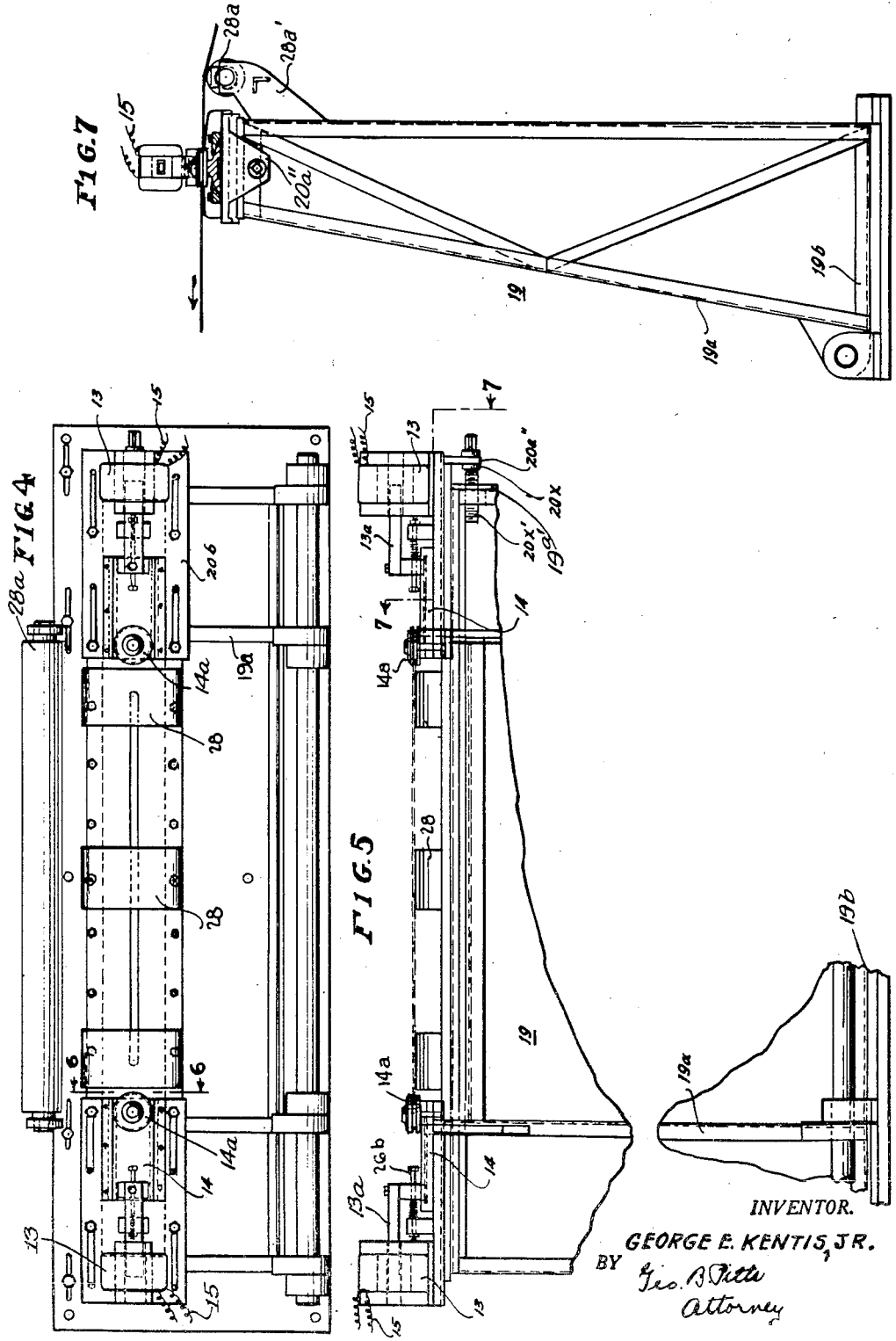
INVENTOR.
GEORGE E. KENTIS, JR.
BY Geo. B Pitts
Attorney

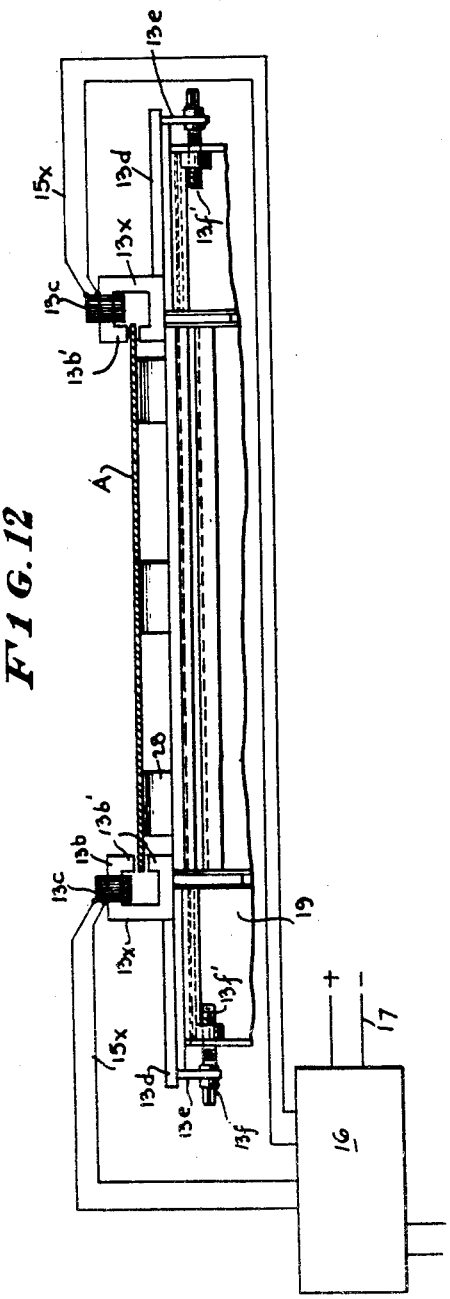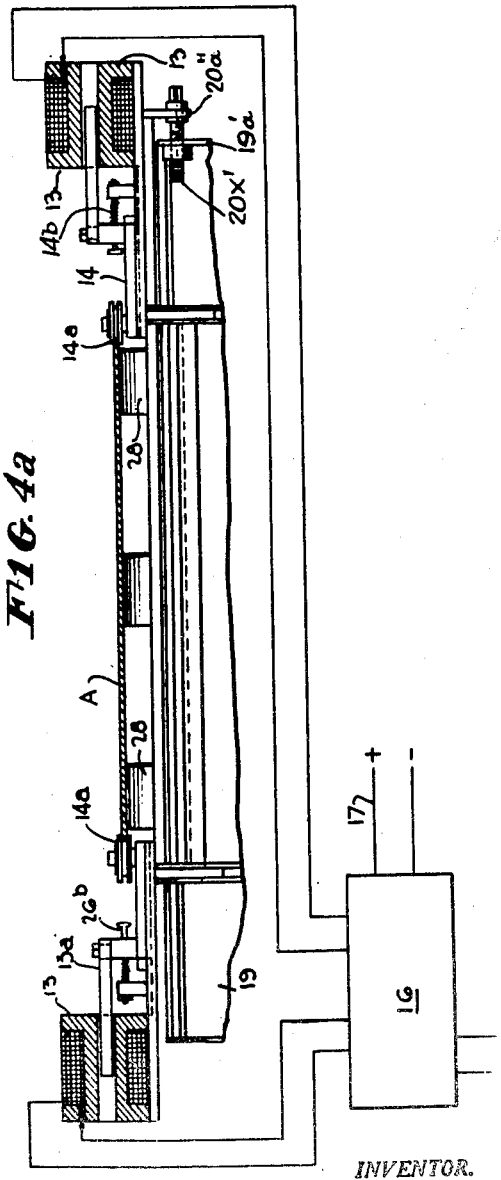

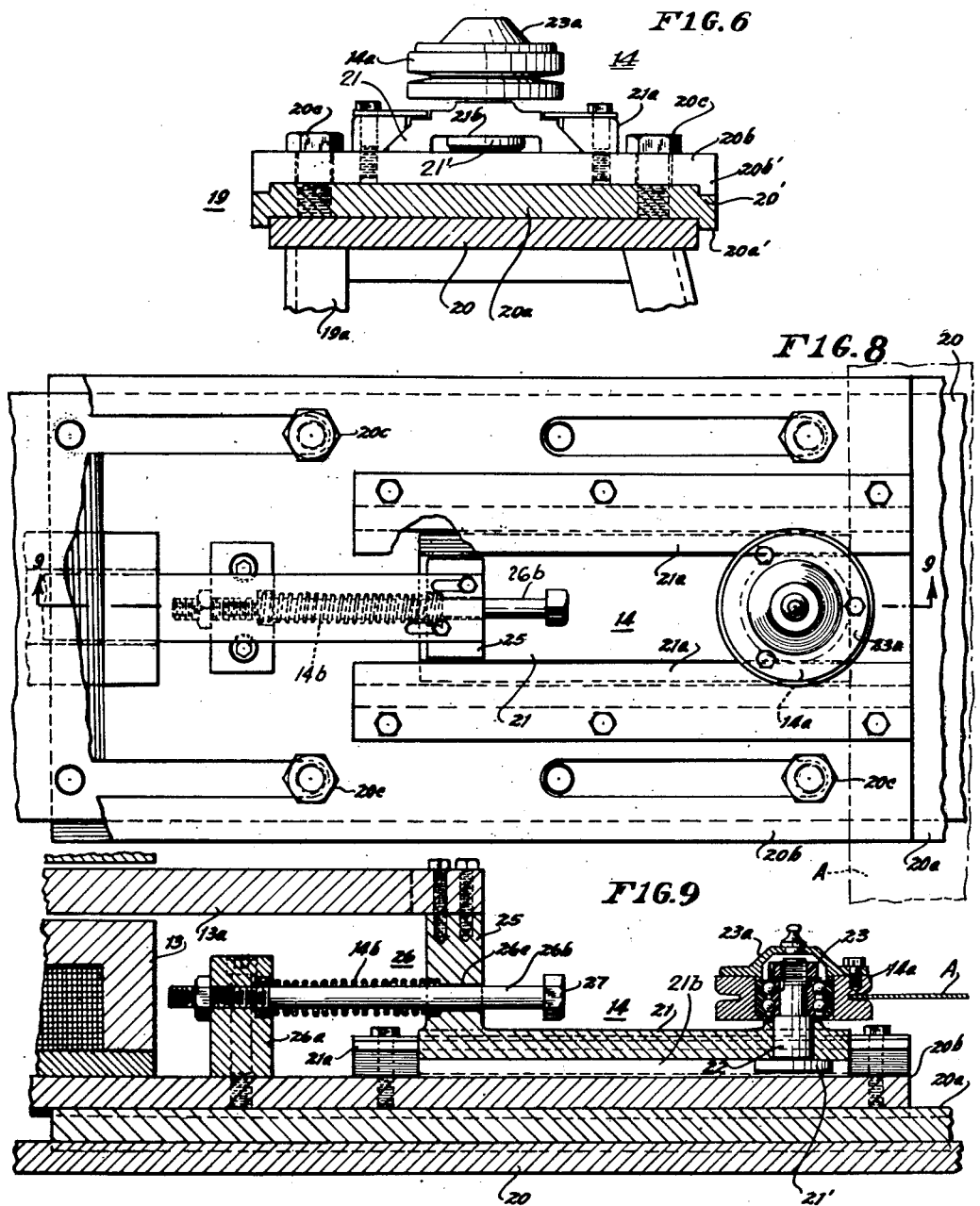

July 3, 1951
G. E. KENTIS, JR
2,558,761
CONTROL SYSTEM
Filed March 2, 1945
7 Sheets-Sheet 6
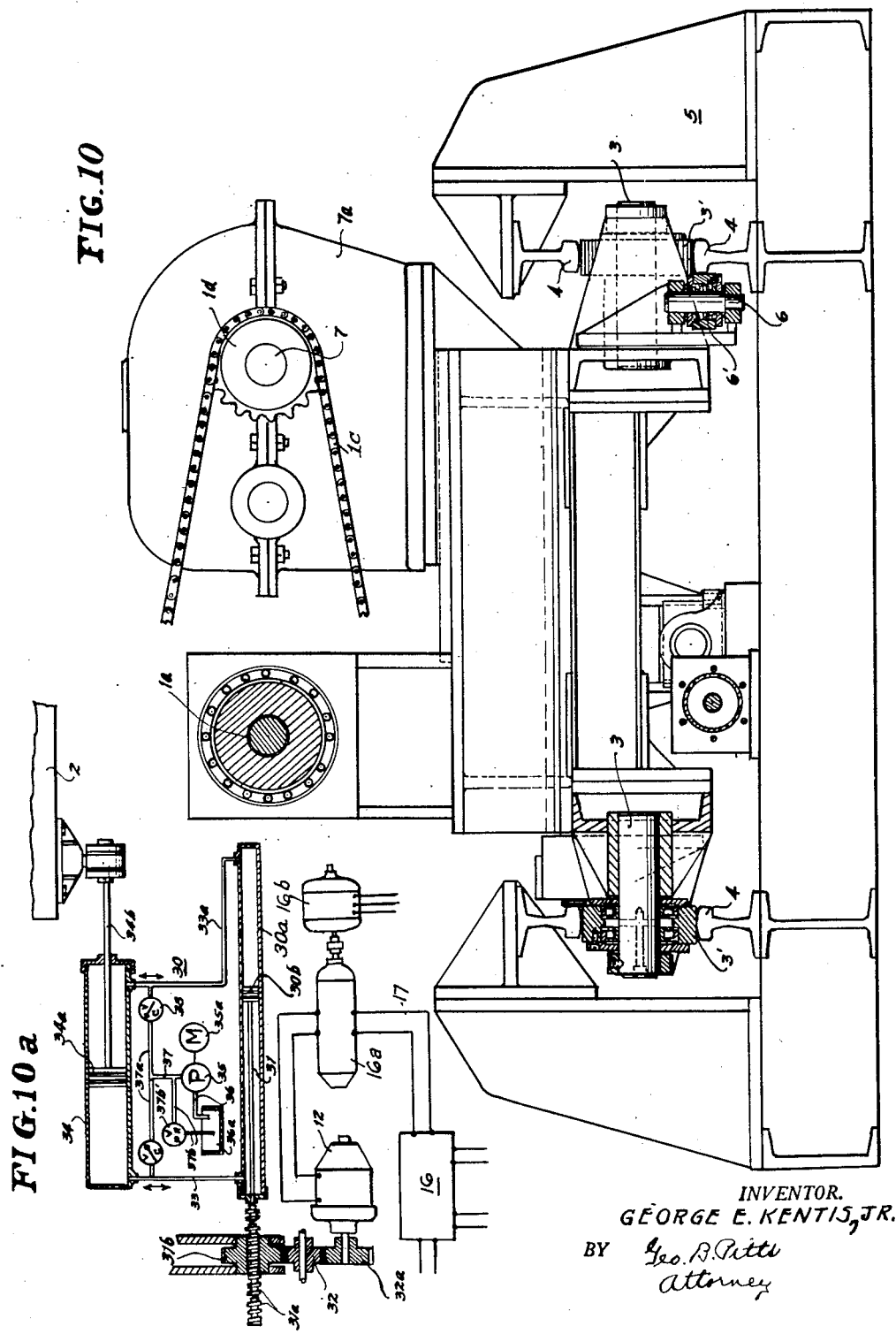
INVENTOR.
GEORGE E. KENTIS, JR.
BY Geo. B. Pitts
Attorney July 3, 1951

G. E. KENTIS, JR 2,558,761

CONTROL SYSTEM

Filed March 2, 1945

INVENTOR.
GEORGE E. KENTIS, JR.
BY Geo. B Pitts
attorney

Patented July 3, 1951

2,558,761

UNITED STATES PATENT OFFICE 2,558,761

CONTROL SYSTEM

George E. Kentis, Jr., Detroit, Mich., assignor to The Yoder Company, Cleveland, Ohio, a corporation of Ohio Application March 2, 1945, Serial No. 580,622

7 Claims. (Cl. 242—76)

This invention relates to means for automatically controlling moving material during feeding thereof, which material may be in wire, strip or sheet form.

In apparatus for feeding and/or guiding moving material, the control means operate to control its movement in response to abnormal physical conditions existing in the material or such conditions (a) which are caused by its supporting and feeding mechanism and/or (b) which result from the treatment of the material during movement thereof. In supplying sheet material to a mechanism which is to slit, deform, shape or stamp it, it is necessary that the material be accurately guided to and in relation to those elements of the mechanism which first engage the material, so that a predetermined relation will be established between the material and each part or set of parts forming such mechanism.

In one specific form of construction herein shown, the material consists of sheet metal, which in many instances is irregular in shape longitudinally; that is, portions thereof are offset or cambered, so that it is necessary to automatically move or adjust the carrier or support on which the material is mounted, and thereafter move or re-adjust the carrier or support, whereby the delivery of the material is uniformly maintained in alined relation to such mechanism throughout the length of the material.

In another specific form of construction shown herein the sheet material is supported on and feeds relative to a plurality of driven rolls, the control means being employed to vary the speed of the rolls to prevent overrunning of the material with resultant sagging thereof and to compensate for variations in the tension of the material resulting from the treatment to which the material may be subjected.

The control means includes a phase shift bridge circuit, which is supplied with current from an outside source, and a reactor or a pair of reactors, the impedance of which is varied in the manner hereinafter set forth to operate the phase shift bridge circuit, whereby the polarity or the strength of the field of a D. C. generator is controlled, to operate a motor in one direction or the other, or at a variable speed, the motor in turn serving to control the material, its feeding elements or a movable member.

One object of the invention is to provide an improved controlling means responsive to the shape of moving material or the abnormal physical conditions or irregularities existing in the material during movement thereof for automatically controlling the movement or direction of movement of the material.

Another object of the invention is to provide improved electrical means arranged to be actuated by moving material to control its delivery to a mechanism adapted to operate on the material.

Another object of the invention is to provide improved electric means arranged to be actuated by moving material due to irregularities therein to control its movement.

A further object of the invention is to provide in apparatus for supplying sheet material from a coil to a mechanism adapted to operate on the material, improved means responsive to the shape of the moving material for maintaining it in alined relation to the mechanism.

Other objects of the invention will be apparent to those skilled in the art to which my invention relates from the following description taken in connection with the accompanying drawings, wherein Fig. 1 is a fragmentary plan view showing the application of my invention to moving material, which in this form of construction is supplied from a coil and is delivered to a machine for operating on the material.

Fig. 2 is a plan view of the drum for supporting a coil of material and the movably supported mounting for the drum.

Fig. 3 is a side elevation of parts shown in Fig. 2, partly diagrammatic to show the control means for moving drum mounting, and partly in section on the line 3—3 of Fig. 2.

Fig. 4 is a plan view of the mechanism which is actuated by the material to operate the control means.

Fig. 4a is a view partly diagrammatic and partly in section on the line 4a—4a of Fig. 1.

Fig. 5 is a side elevation of the mechanism and parts shown in Fig. 4.

Fig. 6 is a section on the line 6—6 of Fig. 4 (enlarged).

Fig. 7 is an end elevation of parts shown in Figs. 4 and 5 partly in section on the line 7—7 of Fig. 5.

Fig. 8 is a fragmentary plan view of parts shown in Figs. 1, 4 and 5 (enlarged).

Fig. 9 is a section on the line 9—9 of Fig. 8.

Fig. 10 is a section on the line 10—10 of Fig. 2 (enlarged).

Fig. 10a is a view partly diagrammatic, showing a modified form of power means.

Figs. 11 and 12 show modified forms of construction.

Figure 11:
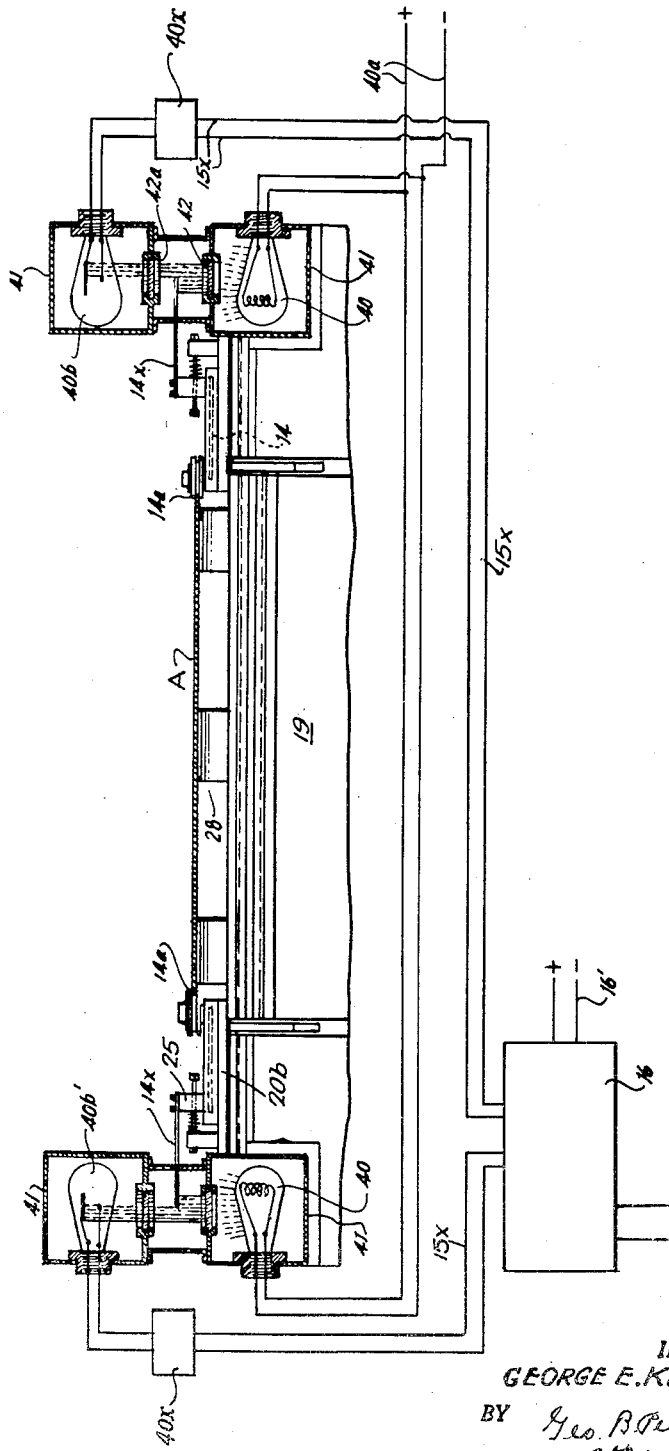

In the form of construction and arrangement shown in Figs. 1 to 10, inclusive, sheet material A of indefinite length, in coil form, is mounted on a drum 1, from which the material is uncoiled and supplied to a machine B, the latter being adapted to continuously operate on the material. The machine B may consist of a preliminary guide roll at the forward end thereof and one or more sets of material engaging parts such as shaping or deforming rolls, cut-offs or dies (not shown) or slitting elements as shown at b. To insure uniformity of the product resulting from the operation of these parts, the contiguous portions of the material must be continuously supplied in alined relation to the guide roll or slitting elements, whereby it may move through the machine B in a definite path for engagement by the parts thereof.

The machine B herein shown for illustrative purposes consists of a slitter having pairs of co-acting slitting elements b (the upper elements only being shown) suitably fixed to rolls on upper and lower shafts c. The shafts c preferably extend at one end into a gear box d, the gearing in the box being driven through a shaft e by a suitable power means f. The slitting elements b serve to trim the edges of the sheet material A, whereby the latter has a predetermined width. The rolls on which the slitting elements are mounted may be provided with one or more pairs of slitting elements intermediate the elements b for slitting the sheet metal into narrow strips, as indicated by the dotted lines b'.

In this form of construction the automatic control means serves to bodily adjust or move the drum 1 to compensate for any camber (indicated by the dotted line a, Fig. 1) which may exist in the material A as the latter feeds to the slitting elements b, whereby the coil of material is maintained in alinement with the slitting elements b and the material is predeterminately guided to the latter. The drum 1 may be of the sectional type, the sections of which are constructed and operate in the manner set forth in Letters Patent No. 2,351,894, dated June 20, 1944, and mounted on a frame, indicated as an entirety at 2. The frame 2 is provided with (a) front and rear pairs of horizontal shafts 3 for wheels 3', which engage upper and lower tracks 4, 4, carried by a frame work 5 and (b) front and rear pairs of vertical shafts 6 for rollers 6', which engage the sides of the lower tracks 4 (see Fig. 10). In this arrangement of mounting the drum supporting frame 2, the latter is guided in its movement to insure movement of the drum 1 endwise irrespective of the pull or tension exerted on the drum 1 or its shaft by the material A during feeding thereof. The drum 1 is preferably driven to effect uncoiling of the material. For this purpose the drum 1 has an inwardly extending shaft 1a, provided with a sprocket 1b, which is engaged by an endless chain 1c, the latter being driven by a sprocket 1d. The sprocket 1d is fixed to a shaft 7 which, through a suitable reduction gearing in a casing 7a, is driven by a motor 8. The means for regulating the speed of the motor 8 are not shown, but when desired the speed of the motor may be controlled by a control means such as above referred to. The frame 2 is provided with a nut 9 through which extends a feed screw 10 mounted in bearings 10a provided on the frame 5 (see Fig. 3). The feed screw 10 is connected at its outer end to a shaft 10' which, through a suitable reduction gearing in a casing 11, is driven by a motor 12. The motor 12 is operated in either direction by the control means, in response to any irregularity in the longitudinal edges of the material, to rotate the feed screw 10, which co-acts with the nut 9 to adjust the drum 1 endwise, whereby the material is supplied in alined relation to the slitting elements b.

The coil of each of the reactors 13 is connected in a circuit 15 of the phase shift bridge, indicated as an entirety at 16. The iron cores 13a of the reactors are operated by actuators, each indicated as an entirety at 14, disposed at opposite sides of the sheet metal A and provided with movable devices 14a in the plane thereof so related to the side edges of the sheet material (preferably in engagement therewith) that the latter, due to any irregularity therein, such as camber, will move one of said actuators laterally and permit movement of the other actuator in the same direction to operate the cores 13a relative to the reactor coils, the effect of which is to vary the impedance in the coils and operate the phase shift bridge 16, with the result that rectified current will be supplied to the field of a D. C. generator 16a and the latter will supply current to the motor 12 to drive it in either direction, dependent on the direction of movement of the cores 13a of the reactors 13. The armature of the generator 16a is continuously driven by a motor 16b which is supplied with current from a suitable source.

When the drum 1 is in normal position, the nut 9 is substantially midway the ends of the feed screw 10 and with the coil of material A on the drum 1 in engagement with its back plate 1', as shown in Fig. 1, the side edges of the material are in alined relation with the slitting elements b, so that the latter will trim the sheet material to a predetermined width, but upon operation of the feed screw, due to camber in the material, in the manner above set forth, the drum will be moved in either direction to automatically maintain this alined relation of the side edges of the material with the slitting elements b.

The actuators 14 are independently mounted and operated, the movable device of each actuator being maintained in engagement with the adjacent side edge of the material A by a spring 14b.

Accordingly, whether the camber a in the material A extends laterally to the right or left, as viewed in Fig. 1, one device 14a will be moved outwardly by the material and the other device will be simultaneously moved inwardly by the adjacent spring 14b, so that both reactor cores will be moved in the same direction, but in opposite relation to their coils.

By preference, the outer ends of the cores 13a, when the side edges of the material during feeding thereof are in alined relation with the elements b, are disposed midway the ends of their respective reactor coils and the latter are so connected in their circuits 15 that movement of the cores 13a in one direction will increase the impedance of the reactors and movement of the cores in the opposite direction will decrease the impedance thereof, whereas the field coils of the generator 16a are so wound that (a) when the devices 14a are moved toward the right (as viewed in Fig. 1) the polarity of the current supplied to the field of the generator 16a will effect operation of the motor 12 in a direction to adjust the drum 1 endwise inwardly and (b)

when the devices 14a are moved toward the left the drum 1 is adjusted endwise outwardly.

The phase shift bridge 16 is of a well known form of construction for which reason it is not illustrated and described. By tuning the phase shift bridge, the cores 13a may be variously positioned with respect to the reactor coils. As will be understood, the output side of the phase shift bridge 16 is connected by leads 17 to the field of the generator 16a. The phase shift bridge 16 is balanced out or inoperative so long as the cores of the reactors remain in neutral position, but upon movement thereof, current flow in one direction or the other will be supplied to the field coils of the generator 16a, whereby the latter will drive the motor 12 in a corresponding direction and hence adjust the drum 1 in response to the operation of the reactors 13.

B' indicates as an entirety a suitable mechanism consisting of a carriage on which a coil of material A may be loaded and then pushed on to the drum 1, the carriage being reciprocated by a hydraulic power means $b^x$.

The actuators 14 are mounted on a table 19, the legs 19a of which are preferably pivotally supported on a base 19b, whereby the table may be swung downwardly when not in use. As shown in Fig. 1, the table 19 is located between the drum 1 and mechanism B. The table 19 is provided with a top member 20 on which is adjustably mounted a support 20a for bases 20b which are adjustably fixed to the support 20a by cap screws 20c. The opposite sides of the support 20a are flanged at 20a' to slidably engage the sides of the member 20 and the support 20a is recessed as shown at 20' to accommodate flanges 20b' on the bases 20b, whereby each of the latter may be adjusted longitudinally of the support 20a. One end of the support 20a is provided with a depending arm 20a'' terminating in a hollow boss 20x, which forms a bearing for a screw 20x', the latter engaging a threaded opening formed in a plate 19a' depending from the top member 20. Operation of screw 20x' serves to adjust the support 20a endwise. As shown in Fig. 9, each base 20b supports one of the actuators 14 and the adjacent reactor 13, so that in any adjustment of either base 20b, the actuator 14 and reactor 13 thereon remain in fixed relation. In this arrangement it will be noted that by adjustment of the support 20a both actuators 14 may be moved laterally in either direction to position them in relation to the drum 1 and mechanism B and by adjustment of one of the bases 20b, the actuators 14 may be located to provide for their engagement and co-action with material A of different widths.

Each actuator 14 comprises the following: 21 indicates a slide having sliding engagement with the adjacent base 20b and guided endwise at right angles to the direction of movement of the material A by keys or guides 21a suitably fixed to the base 20b. At or adjacent its inner end slide 21 is provided with an upwardly extending stud shaft 22 on which is rotatably mounted a material engaging device 14a consisting of a roller the periphery of which is preferably grooved to receive the adjacent marginal side edge of the material A. The roller 14a is preferably mounted on anti-friction bearings. The shaft 22 is mounted in an opening formed in the slide 21, the lower end of the shaft having a head 21' (wall of the slide 21 being recessed as shown at 21b to accommodate the head), and the upper end of the shaft being provided with a nut 23 which engages the inner races of the anti-friction bearings to clamp the head 21' to the slide. A cap 23a suitably fixed to the upper side of the roller 14a forms a closure for the anti-friction bearings. The outer end of the slide 21 is provided with a post 25 to which is adjustably secured the inner end of the core 13a for the adjacent reactor 13, whereby endwise movement of the slide 21 will effect movement of the reactor core. 26 indicates as an entirety spring operated means operatively engaging the slide 21 and normally tending to move it inwardly, namely, in a direction toward the other actuator 14, so that the adjacent roller or device 14a may be maintained in engagement with the material and follow the camber therein, that is, the concaved edge portion a' of the camber during feeding of the material A. The illustrated construction of the spring operated means 26 consists of a standard 26a mounted on the base 20b inwardly of the reactor 13 and between it and the inner end of the slide 21. The standard 26a is formed with a screw threaded through opening (preferably in line with the stud shaft 22), in which is mounted the threaded end of the bolt 26b. The bolt 26b extends through and loosely fits an opening 26c formed in the post 25, the head 27 of the bolt 26b being spaced from the post 25 when the roller 14a is in engagement with the material A, as shown in Figs. 1 and 9, but arranged to form a stop to limit the inward movement of the slide 21. The spring 14b (already referred to) is coiled around the bolt 26b and engages the standard 26a and post 25 and normally exerts pressure on the latter to move the slide 21 inwardly and maintain the roller 14a in engagement with the material A.

28 indicates a plurality of blocks suitably fixed to the support 20a between the actuators 14 for supporting the material A in the plane of the grooves formed in the rollers 14a (see Fig. 5).

28a indicates a roller suitably supported on arms 28a' carried by the table legs 19a on the forward side of the top member 20. The roller 28a co-operates with the blocks 28 to guide the material A in a horizontal plane as it feeds past the rollers 14a.

Operation: According to Fig. 1 the material A is being delivered from the drum 1 to the slitters b with the side edges thereof in alined relation to the latter. During feeding of the material in this manner the material engaging devices or rollers 14a are in normal position with the cores 13a of the reactors 13 extending into their respective coils and the phase shift bridge 16 is balanced or inoperative, so that no current is being supplied to the field of the generator 16a. As the material feeds to the slitters b, in the event any camber is present therein, as shown by dotted line a, the rollers 14a will move laterally and operate the reactor cores 13a, the effect of which will be to vary the impedance in the reactors 13 and operate the phase shift bridge 16 and thus effect current flow in one direction to the field of the generator 16a, whereby the motor 12 will be driven in a direction to move the drum 1 inwardly (toward the left as viewed in Fig. 1) and shift the moving material to aline the edges a thereof with the slitting elements b; in this movement of the drum 1 the cores of the reactors 13 will be moved to their normal positions thereby balancing the phase shift bridge 16 and cutting off current flow to the field of the generator 16a, but as the movement of the material A to the left, as above set forth, disposes that portion thereof contiguous to and rearward of the cambered portion

*a*, out of alinement with the slitting elements *b*, the engagement of such contiguous portion with the rollers 14*a* will operate the actuators 14 toward the left, as viewed in Fig. 1, which operation will effect operation of the bridge 16 and current flow in the opposite direction to the field of generator 16*a* to drive the motor 12 in the opposite direction and move the drum 1 toward the right to again aline the edges of the material A with the elements *b* and move the cores of the reactors 13 to their normal positions to balance out the phase shift bridge 16.

Fig. 10*a* shows a modified arrangement wherein the driven motor 12 operates through a hydraulic power mechanism, indicated as an entirety at 30, to move the frame 2 in either direction. The mechanism 30 consists of the following: 30*a* indicates a cylinder for a piston 30*b* connected to a rod 31 having an extended portion 31*a* provided with screw threads, which engage a nut 31*b*. The nub 31*b* is mounted in suitable bearings and held against axial movement thereby, so that when the nut is rotated it moves the rod 31*a* endwise according to the direction of rotation of the nut. The periphery of the nut 31*b* is provided with gear teeth in mesh with a gear 32, which in turn is in mesh with a gear 32*a* fixed to the shaft of the motor 12, it being understood that the driving connection between the motor 12 and nut 30*b* may be modified to provide any desired gear reduction to control the rate of movement of the piston 30*b*. 33, 33*a* indicate pipes leading from the opposite ends of the main cylinder 30*a* to corresponding ends of a power cylinder 34, in which is mounted a piston 34*a* connected by a rod 34*b* to the frame 2. 35 indicates a suitable pump adapted to be continuously driven by a motor 35*a* for supplying liquid (preferably oil) to the system. The intake pipe 36 for the pump 35 leads from a sump 36*a*. The discharge side of the pump 35 is connected to a pipe 37 which is connected to branch pipes 37*a*, the latter being connected to the pipes 33, 33*a*. 37*b* indicates a pipe connected to the pipe 37 and arranged to discharge the liquid into the sump 36*a*. The pipe 37*b* is provided with a pressure regulating valve 37*b*'. Each branch pipe 37*a* is provided with a suitable adjustable check valve 38. It will be understood that the cylinders 30*a*, 34, and pipes are maintained filled with liquid under pressure determined by the adjustment of the valve 37*b*', so that the pressure is equalized on opposite sides of the pistons 30*b*, 34*a*. The pistons 30*b*, 34*a*, are disposed substantially midway the ends of their respective cylinders when the material A is being supplied in alined relation to the slitting elements *b* (as shown in Fig. 1), so that each may be moved in either direction. As will be observed, movement of the piston 30*b* toward the right (as viewed in Fig. 10*a*) due to operation of the motor 12, will force the liquid from the cylinder 30*a* through pipe 33*a* into the cylinder 34 at one side of the piston 34*a* and operate the latter and the frame 2 toward the left, and such operation of the piston 34*a* will serve to force the liquid on the other side of the piston 34*a* through the pipe 33 into the cylinder 30*a*. When the piston 30*b* is moved toward the left, flow of the liquid in the pipes 33, 33*a*, is reversed. By adjustment of the valves 37*b*' and 38, the pressure on opposite sides of the respective pistons 30*b* and 34*a* is maintained equalized.

Fig. 11 illustrates a modified form of construction for operating the phase shift bridge 16, the output leads 16' of which are connected to the field of the generator 16*a*, as shown in Fig. 2. In this form of construction the sheet material A feeds from the drum 1 over the table 19 to the slitting elements *b*, the table 19 being provided with slidably mounted actuators 14 having rollers 14*a* normally engaging the side edges of the material A, as already set forth in connection with the form of construction shown in Fig. 1 and each carrying an arm 14*x*. The table 19 and actuators 14 are preferably constructed similarly to like parts shown in Figs. 1, 4, 5, 6, 7, 8 and 9. 40, 40 indicate sources of light, such as electric light bulbs, supplied with current from mains 40*a* and arranged to emit light rays perpendicularly to the arms 14*x* and project them on photo-electric cells 40*b*, 40*b*', of well known construction, the anode and cathode of each cell being connected by leads 15*x* through a suitable amplifying circuit, indicated at 40*x*, which in turn is connected to the phase shift bridge 16. In the illustrated arrangement the bulbs 40 are mounted below the arms 14*x* and the cells 40*b*, 40*b*', are mounted thereabove, but these mountings may be reversed.

Each bulb 40 and each cell 40*b*, 40*b*', is mounted in an enclosure 41. The upper wall of the enclosure 41 for each bulb 40 is provided with a lens 42 and the bottom wall of the enclosure 41 for the adjacent cell is provided with a lens 42*a* alined with the lens 42, both lens being of the polarized type to eliminate interference of light from exterior sources and direct the emitted light rays through the lens to the cells 40*b*, 40*b*'. The enclosure 41 for each cell 40*b*, 40*b*' is supported on the enclosure 41 for the adjacent bulb 40 and the latter is fixedly carried by the base plate 20*b* for the adjacent actuator 14 for adjustment therewith; also each arm 14*x* is adjustable on the adjacent post 25 or the latter is adjustable on the plate 20*b*, for varying widths of sheet material. When the actuators 14 are in normal position, the outer ends of the arms 14*x* terminate within the area traversed by the light rays, preferably midway thereof; in this position of the arms 14*x* the phase shift bridge 16 is balanced out. In this form of construction the number of light rays being intercepted by the arms 14*x* is increased by one arm 14*x* and decreased by the other arm 14*x* upon movement of the actuators 14 either direction. As the cells are oppositely connected to the bridge 16, such increase and decrease of the rays thereon will modify the voltage in the circuits 15*x*, whereby the phase shift bridge 16 is controlled and operated in the manner already set forth.

Fig. 12 illustrates a modified form of construction wherein the marginal edges of the sheet metal A are related to a pair of reactors 13*x*. In this form of construction each reactor 13*x* consists of a core 13*b* shaped to provide poles 13*b*' forming therebetween, a gap through which the marginal edges of the sheet metal move during feeding thereof from the drum 1 to the slitting elements *b*. One arm of each core 13*b* is provided with a coil 13*c* connected by leads 15*x* to the phase shift bridge 16 (shown in Fig. 2), the output leads of which are connected to the field of the generator 16*a*. Each reactor 13*x* is connected to the inner end of a plate 13*d* having at its outer end a depending arm 13*e* provided with a boss 13*f*, which forms a bearing for a feed screw 13*f*'. The screw 13*f*' extends through a threaded opening formed in a portion of the table 19 and when rotated serves as a means for adjusting the adjacent reactor 13x to position its poles 13b' in relation to the adjacent side edge of the material, so that the side edges thereof are similarly related to the faces of the poles 13b'. These adjustment means provide for the positioning of both reactors for different widths of sheet metal A with their side edges related to the poles thereof, as above set forth. So long as the side edges of the material A are maintained in this relation to the poles 13b' the phase shift bridge 16 will be balanced or in-operative and no current will be supplied to the generator 16a, but in the event of camber existing in the material the off-set edges thereof will vary the impedance in the reactors and hence cause operation of the phase shift bridge 16 and effect operation of the motor 12 in the manner already set forth to adjust the drum 1 endwise in one direction. As the succeeding portion of the metal contiguous to the camber feeds through the poles of the reactors 13x the impedance of the latter will be varied to cause operation of the phase shift bridge 16 and effect readjustment of the drum 1 to its first or normal position.

From the foregoing description it will be observed that I provide for an apparatus and electrical means responsive to changes in the path of movement of material or abnormal physical properties therein, whereby the material or element which engages therewith is adjusted, one relative to the other, to maintain the material and element in a fixed relation.

To those skilled in the art to which my invention relates many changes in construction and widely differing embodiments and applications thereof will be apparent without departing from the spirit and scope of the invention. My disclosures and the description herein are purely descriptive and are not intended to be in any sense limiting.

What I claim is:

1. In web controlling apparatus, reversible means for shifting the web laterally, means for controlling said shifting means comprising, a normally balanced phase shift bridge, an output circuit for said phase shift bridge connected to control the operation of said shifting means, means adjacent the two edges of said web influenced by lateral shifting of the web in opposite directions from a normal position to unbalance the phase shift bridge in opposite directions to render said shifting means operable in the appropriate direction to return the web to a normal position.

2. In a web controlling apparatus, means for supporting a roll of sheet material for unwinding from the roll as a web and adapted to extend therefrom in a normal position, means for shifting said roll supporting means axially of the roll, means for controlling said shifting means comprising, a normally balanced phase shift bridge, electrical means associated with the phase shift bridge mounted adjacent one edge of said web for creating an unbalanced condition of the phase shift bridge upon lateral movement of the web from said normal position, other electrical means associated with the phase shift bridge mounted adjacent the other edge of the web influenced by said lateral shifting of the web from the normal position augmenting the unbalanced condition of the phase shift bridge, and means for rendering said shifting means operable to return the web to the normal position in response to the unbalanced condition of the phase shift bridge.

3. In web controlling apparatus, means for supporting a roll of sheet material for unwinding from the roll as a web so as to extend therefrom in a normal position, supporting means for the roll, a motor for moving said roll axially thereof, a generator connected to said motor, a field winding for said generator, a normally balanced phase shift bridge, electrical means associated with said phase shift bridge mounted adjacent one edge of said web for creating an unbalanced condition of the phase shift bridge upon lateral movement of the web from said normal position, additional electrical means associated with the phase shift bridge mounted adjacent the other edge of the web for augmenting the unbalanced condition of the phase shift bridge upon said lateral movement of the web from the normal position, and an output circuit for said phase shift bridge connected to the field winding of said generator.

4. In web controlling apparatus, means for shifting the web laterally, means for controlling said shifting means comprising, a normally balanced phase shift bridge, an output circuit for said phase shift bridge connected to said shifting means, a reactor coil adjacent one edge of said web and associated with said phase shift bridge, a core associated with said reactor coil movable upon lateral shifting of the web from a normal position creating an unbalanced condition of the phase shift bridge to render said shifting means operable to return the web to the normal position.

5. In a web controlling apparatus, means for supporting a roll of sheet material adapted to extend from the roll as a web in a normal position, a normally balanced phase shift bridge, means including a reactor coil connected to said bridge and arranged adjacent one edge of said web and being operable to increase the impedance of said coil by lateral movement of the web in one direction from normal position to unbalance said phase shift bridge, means including another reactor coil connected to said bridge and arranged adjacent the other edge of said web and operable to lower the impedance of the second coil upon said movement of the web from the normal position to augment the unbalanced condition of the phase shift bridge, and means operable upon the attainment of an unbalanced condition of the phase shift bridge for shifting said roll supporting means laterally to return the web to a normal position.

6. In a web controlling apparatus, means for shifting the web laterally, means controlling said shifting means comprising, a normally balanced phase shift bridge, an output circuit for said phase shift bridge connected to said shifting means, a reactor coil adjacent one edge of said web and associated with said phase shift bridge, a core movable upon lateral shifting of the web for changing the impedance of said reactor coil to unbalance said phase shift bridge, another reactor coil adjacent the other edge of the web and associated with said phase shift bridge, a second core associated with the second reactor coil movable upon said lateral shifting of the web to change the impedance of the second reactor coil to augment the unbalanced condition of said phase shift bridge whereby the shifting means is rendered operable to return the web to a normal position.

7. In a web controlling apparatus, means for shifting the web laterally, a normally balanced phase shift bridge having an output circuit connected to said shifting means, photo-electric means adjacent one edge of the web associated with the phase shift bridge and operable upon lateral shifting of the web from a normal position to create an unbalanced condition in said phase shift bridge, additional photo-electric means adjacent the other edge of said web and associated with said phase shift bridge operable upon said lateral shifting of the web for augmenting the unbalanced condition of said phase shift bridge whereby the shifting means is rendered operable to return the web to a normal position.

GEORGE E. KENTIS, JR.

REFERENCES CITED

The following references are of record in the file of this patent:

UNITED STATES PATENTS

| Number | Name | Date |
|---|---|---|
| 1,945,981 | Quinby | Feb. 6, 1934 |
| 2,032,176 | Kovalsky | Feb. 25, 1936 |
| 2,066,377 | Wean et al. | Jan. 5, 1937 |
| 2,078,669 | King | Apr. 27, 1937 |
| 2,146,869 | White | Feb. 14, 1939 |
| 2,147,467 | Stephenson | Feb. 14, 1939 |
| 2,166,551 | Perry | July 18, 1939 |
| 2,203,181 | Potdevin et al. | June 4, 1940 |
| 2,209,220 | Berry | July 23, 1940 |
| 2,214,609 | Drake | Sept. 10, 1940 |
| 2,223,974 | Thompson et al. | Dec. 3, 1940 |
| 2,281,063 | Cook | Apr. 18, 1942 |